Sept. 6, 1960 S. EDEMA 2,951,386
RECORD PLAYER TRANSMISSION
Filed April 19, 1957

INVENTOR
SJOERD EDEMA

BY
AGENT

United States Patent Office 2,951,386
Patented Sept. 6, 1960

2,951,386
RECORD PLAYER TRANSMISSION

Sjoerd Edema, Eindhoven, Netherlands, assignor to North American Philips Company, Inc., New York, N.Y., a corporation of Delaware Filed Apr. 19, 1957, Ser. No. 653,775

Claims priority, application Netherlands May 4, 1956

5 Claims. (Cl. 74—200)

The invention relates to a record player in which, in order to obtain different speeds of rotation of the turntable, a friction wheel can be displaced in the direction of length of a driving shaft, co-operating herewith and having different diameters and be fixed in a definite position by means of a pin and groove structure, in which one of the groove walls is provided with stop positions, in which the pin is held by the action of a spring or the like.

In accordance with the invention the other groove wall is shaped in a form such that a first movement of the pin relative to the groove against the spring force automatically leads to a second movement of the pin relative to the groove in the direction of the groove, after which the pin is held in the next following stop position by the spring action.

It is thus possible to change the speed of the turntable only by moving the pin or the groove against the spring force, the moved part being provided with the friction wheel. This structure is therefore suitable for use with a record player in which the aforesaid change of speed is obtained by depressing a push-button. It is sufficient to depress and then relax the push-button in order to displace the friction wheel over a given distance along the driving shaft and to hold it in a further position.

According to a further feature of the invention the second relative movement as a consequence of the first always takes place in the same sense, which can be carried out structurally in a simple manner.

The second relative movement is preferably constituted by a rotation, the groove lying, in this case, in a cylindrical plane extending for at least 180° around the axis of rotation, the ends of the groove being open, the central part of the pin going through the axis of rotation. By depressing the push-button the various speeds of the turntable can thus be adjusted according to a fixed scheme. When, owing to the second relative movement, one end of the pin leaves the groove, the same movement provides that the other end of the pin is guided into the groove and takes up the function of the former without interruption.

The structure so far described permits of providing the pin or the groove body, performing the second relative movement, with a speed indicator disc. The adjusted speed of the turntable can thus be read in a simple manner.

The invention will be described more fully with reference to one embodiment.

Figure 1:
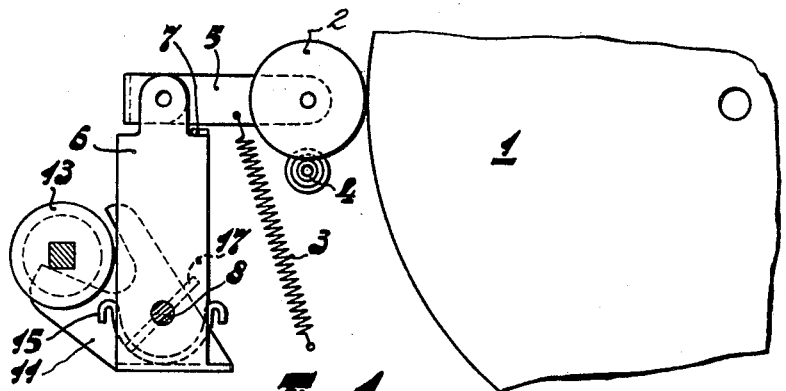
Fig. 1 is a plan view of a driving device for a turntable.
Figures 2, 3:
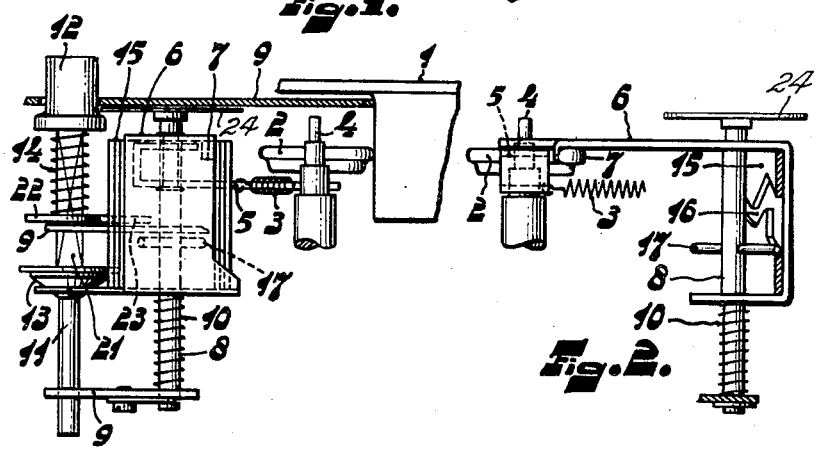
Fig. 2 is a side view of the driving device shown in Fig. 1.
Fig. 3 is a side view of the control-device for the change-over of the driving device shown in Fig. 1.
Figure 4:
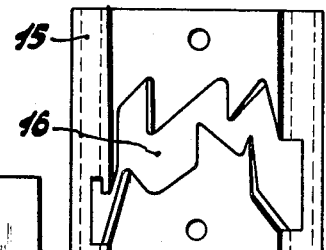
Fig. 4 is a side view of the groove body.

A turntable 1 is driven by means of a friction wheel 2, which is drawn with the aid of a spring 3 against a motor shaft 4 and the turntable 1. The motor shaft 4 has three different diameters, each of which is adapted to co-operate with the friction wheel when the friction wheel is displaced in the direction of the shaft 4. The friction wheel 2 is mounted on an arm 5, which is pivotable on a strap 6. A stop 7 on the strap 6 confines the movement of the arm 5 with respect to the strap 6. The strap 6 is displaceable and rotatable through a confined angle on a shaft 8, which is fastened, so as to be rotatable, to the frame 9 of the device and is locked up in an axial direction. A speed indicator disc 24 is secured to the upward end of the shaft 8. A spring 10 urges the strap 6 upwards. The strap 6 is furthermore provided with an extension 11, by means of which the strap 6 with the arm 5 and the friction wheel 2 is controlled. The extension 11 co-operates to this end with a conical governing disc 13, secured to a push-button 12. A spring 14 holds the push-button in its top position. The strap 6 is provided with a groove body 15, having a groove 16, with which co-operates a pin 17, which is clamped in the shaft 8.

Figures 5, 6:
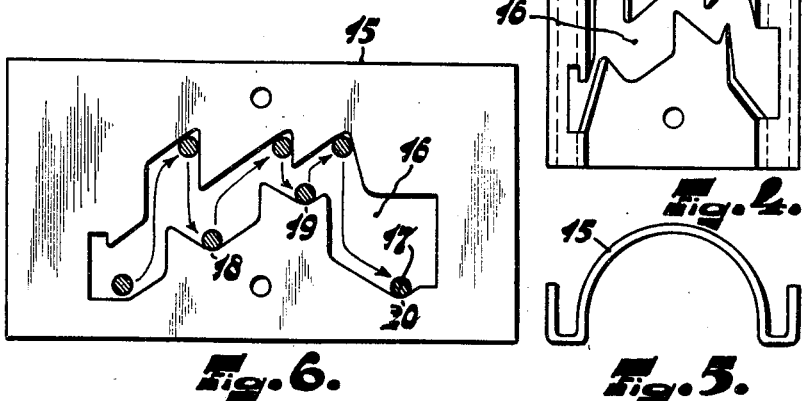
Fig. 5 is a plan view of the body shown in Fig. 4.
Fig. 6 is an exploded view of the groove in a flat plane, the pin being shown in different positions with respect to the groove.

The device operates as follows. By depressing the push-button 12 the disc 13 is urged with its oblique side against the extension 11, which is thus first rotated about the shaft 8 until it engages the flat part of the disc 13. This rotation results in that the friction wheel 2 is moved away from the turntable 1 and the motor shaft 4, whilst the arm 5 engages the stop 7. During the further movement of the disc 13 the strap 6 is urged downwards against the action of the spring 10, so that the pin 17 engages the upper boundary of the groove. Since this boundary is oblique (see Fig. 6), the pin 17 together with the shaft 8 is rotated until the pin engages a vertical boundary of the upper groove wall. Thus the movement is stopped and the push-button 12 is released. Under the action of the spring 10 the strap 6 is moved upwards, so that the pin 17 engages the lower groove wall. The lower groove wall is provided with stop positions 18, 19 and 20. One end of the pin 17 traverses the entire groove in the aforesaid manner, when the push-button is depressed three times. When this end leaves the groove, the other end of the pin 17 is guided into the groove 16, so that the push-button can be depressed without interruption and the various speeds of the turntable can be adjusted in accordance with a fixed scheme. The push-button 12 is seated on a shaft 21, which is provided with a governing collar 22. By turning the button 12 on arm 23 is controlled which arm may co-operate for example with an eddy-current brake to obtain a fine adjustment of the correct speed of the turntable.

With the embodiment shown the groove body 15 is moved against the spring force, whereas the pin 17 performs the second movement. Of course, the first-mentioned movement may be transferred to the pin 17, so that the groove body performs the secondary movement.

What is claimed is:

1. A plural speed record player comprising a turntable, a drive shaft having different diameters, a friction wheel, means mounting said friction wheel adjacent to said drive shaft and displaceable in the direction of length of the latter, spring means normally biasing said friction wheel into engagement with said drive shaft and turntable, indexing means for controlling the displacement of said friction wheel including a wall having a sinuous groove therein, a rotatable shaft, means mounting said rotatable shaft substantially parallel to said drive shaft, a pin mounted on said rotatable shaft having parts thereof insertable in said groove, resilient means co-acting with said groove wall, and a finger piece on said indexing means operatively connected to said groove wall for moving the latter relative to said pin, said groove wall being shaped in a form whereby the movement of said groove wall against the force of said resilient means by means of said indexing means causes limited rotation of the rotatable shaft and part of said pin in said groove wall and maintains said groove wall at various levels determined by the predetermined stop positions for said pin in the lower portion of said sinuous groove.

2. A plural speed record player as claimed in claim 1 wherein the direction of movement from said first stop position to said second stop position is always in the same direction.

3. A plural speed record player comprising a turntable, a drive shaft having different diameters, a friction wheel, means mounting said friction wheel adjacent to said drive shaft and displaceable in the direction of length of the latter, spring means normally biasing said friction wheel into engagement with said drive shaft and turntable, indexing means for controlling the displacement of said friction wheel including a wall having a sinuous groove therein, a rotatable shaft, means mounting said rotatable shaft substantially parallel to said drive shaft, a pin mounted on said rotatable shaft having parts thereof insertable in said groove, resilient means co-acting with said groove wall, and a finger piece on said indexing means operatively connected to said groove wall for moving the latter relative to said pin, said groove wall being shaped in a form whereby the movement of said groove wall against the force of said resilient means by means of said indexing means causes limited rotation of the rotatable shaft and part of said pin in said groove wall, and maintains said groove wall at various levels determined by the predetermined stop positions for said pin in the lower portion of said sinuous groove, said wall being arcuate and said groove extending in said wall prescribing a segment of a circle of at least 180°.

4. A plural speed record player as claimed in claim 1 further comprising a speed indicator disc for said indexing means secured to said rotatable shaft.

5. A plural speed record player as claimed in claim 1 wherein said parts of the pin are located at opposite sides of said rotatable shaft whereby when one part of said pin has moved out of said groove, the other part enters said groove.

References Cited in the file of this patent

UNITED STATES PATENTS

| | | |
|---|---|---|
| 2,248,384 | Redin | July 8, 1941 |
| 2,260,319 | Hoehn | Oct. 28, 1941 |
| 2,564,290 | Williamson et al. | Aug. 14, 1951 |
| 2,788,669 | Richards | Apr. 16, 1957 |
| 2,826,925 | Singer | Mar. 18, 1958 |